(12) United States Patent
Whelan et al.

(10) Patent No.: US 7,093,798 B2
(45) Date of Patent: Aug. 22, 2006

(54) TRANSFORMABLE AIRPLANE

(75) Inventors: David A. Whelan, Newport Beach, CA (US); Robert H. Liebeck, Irvine, CA (US); Derrell L. Brown, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/769,125

(22) Filed: Jan. 30, 2004

(65) Prior Publication Data

US 2005/0178912 A1    Aug. 18, 2005

(51) Int. Cl.
*B64C 1/00*    (2006.01)
(52) U.S. Cl. ..................................... 244/120
(58) Field of Classification Search ............. 244/118.1, 244/118.2, 118.5, 118.6, 119, 120, 125, 137.1, 244/1 R, 137.2, 137.3, 135 R, 135 A, 135 B, 244/135 C, 136
See application file for complete search history.

(56) References Cited

U.S. PATENT DOCUMENTS

| | | | | |
|---|---|---|---|---|
| 2,367,538 A | * | 1/1945 | Sullivan | 244/137.1 |
| 2,388,380 A | * | 11/1945 | Bathurst | 244/118.2 |
| 2,404,195 A | * | 7/1946 | Schlieben | 244/137.1 |
| 2,442,459 A | * | 6/1948 | Fowler | 244/118.2 |
| 2,448,862 A | * | 9/1948 | Conklin | 244/118.2 |
| 2,472,947 A | * | 6/1949 | Hlobil | 244/118.1 |
| D157,645 S | * | 3/1950 | Thiebolt | D12/335 |
| 2,500,015 A | * | 3/1950 | Tweney et al. | 244/119 |
| D160,503 S | * | 10/1950 | Knight | D12/194 |
| 2,597,563 A | * | 5/1952 | Breazeale, Jr. | 244/118.2 |
| 2,697,569 A | * | 12/1954 | Westcott, Jr. | 244/118.2 |
| 2,752,114 A | * | 6/1956 | Calvy | 244/118.3 |
| 2,759,691 A | * | 8/1956 | Weaver et al. | 244/118.3 |
| 2,977,077 A | * | 3/1961 | Pearson | 244/118.1 |
| 2,977,853 A | * | 4/1961 | Gehrkens et al. | 89/1.51 |
| 2,985,412 A | * | 5/1961 | Hart et al. | 244/137.1 |
| 3,003,717 A | * | 10/1961 | Booker | 244/2 |
| 3,009,672 A | * | 11/1961 | Tharratt | 244/137.1 |
| 3,028,130 A | * | 4/1962 | Burton | 244/137.1 |
| 3,077,144 A | * | 2/1963 | Barker, Jr. et al. | 89/1.819 |
| 3,142,461 A | * | 7/1964 | Tomlinson | 244/137.1 |
| 3,381,921 A | * | 5/1968 | McDonough et al. | 410/79 |
| 3,486,204 A | * | 12/1969 | Miller, Jr. et al. | 24/606 |
| 3,522,919 A | * | 8/1970 | Bader | 244/137.1 |
| 3,692,203 A | * | 9/1972 | Byrd et al. | 220/1.5 |
| 3,741,504 A | * | 6/1973 | Alberti et al. | 244/137.1 |
| 3,836,101 A | * | 9/1974 | Mattia et al. | 244/137.1 |
| 3,861,541 A | * | 1/1975 | Taft et al. | 414/345 |

(Continued)

*Primary Examiner*—Michael Carone
*Assistant Examiner*—Stephen A. Holzen
(74) *Attorney, Agent, or Firm*—Robert R. Richardson, P.S.

(57) ABSTRACT

A transformable airplane may be reconfigured easily and rapidly to perform any one or a combination of tanking, transport, bombing, or command and control missions as desired for a tactical situation by installing or replacing mission-specific modules as desired. A reconfigurable aircraft includes a pair of wings and an aircraft body having at least one bay defined in an interior of the aircraft body. The at least one bay is configured to accept a plurality of removably replaceable modules that configure the aircraft to perform a plurality of missions. Transport mission modules may include space and tie-downs for cargo pallets and/or palletized seating. A roll-on/roll-off ramp may be provided. Tanking mission modules may include a remote aerial refueling operator station. Bombing mission modules may include a bomb rack and a bomb ejector. ISR mission modules may include command and control stations in signal communication with phased array antennas.

75 Claims, 12 Drawing Sheets

U.S. PATENT DOCUMENTS

| | | | | | |
|---|---|---|---|---|---|
| 3,881,671 | A | * | 5/1975 | Bouchnik | 244/140 |
| 3,885,685 | A | * | 5/1975 | Montgomery et al. | 414/391 |
| 3,899,092 | A | * | 8/1975 | Nordstrom | 410/87 |
| 3,947,080 | A | * | 3/1976 | Ege | 439/249 |
| 3,951,362 | A | * | 4/1976 | Robinson et al. | 410/68 |
| 3,979,005 | A | * | 9/1976 | Robinson et al. | 220/560.07 |
| 4,046,277 | A | * | 9/1977 | Morrison | 220/1.5 |
| 4,126,162 | A | * | 11/1978 | Clark et al. | 141/98 |
| 4,186,901 | A | * | 2/1980 | Shorey | 244/137.1 |
| 4,208,949 | A | * | 6/1980 | Boilsen | 89/1.801 |
| 4,234,278 | A | * | 11/1980 | Harshman et al. | 410/69 |
| 4,235,399 | A | * | 11/1980 | Shorey | 244/137.1 |
| 4,301,984 | A | * | 11/1981 | Olason | 244/137.1 |
| 4,318,328 | A | * | 3/1982 | Rona | 89/1.815 |
| 4,358,072 | A | * | 11/1982 | Williamson | 244/2 |
| 4,379,533 | A | * | 4/1983 | Caldwell et al. | 244/118.1 |
| 4,388,030 | A | * | 6/1983 | Skaale | 410/69 |
| 4,395,172 | A | * | 7/1983 | Hoener et al. | 410/84 |
| 4,409,880 | A | * | 10/1983 | Fetterly | 89/1.804 |
| 4,416,435 | A | * | 11/1983 | Szendrodi et al. | 244/114 R |
| 4,432,515 | A | * | 2/1984 | Jarvineva | 244/123 |
| 4,437,630 | A | * | 3/1984 | Jefferies | 244/136 |
| 4,447,025 | A | * | 5/1984 | Bock et al. | 244/118.2 |
| 4,449,679 | A | * | 5/1984 | McComas | 244/118.2 |
| 4,483,499 | A | * | 11/1984 | Fronk | 244/118.1 |
| 4,608,907 | A | * | 9/1986 | Ellis et al. | 89/1.815 |
| 4,624,425 | A | * | 11/1986 | Austin et al. | 244/13 |
| 4,637,292 | A | * | 1/1987 | Peterson | 89/1.804 |
| 4,681,013 | A | * | 7/1987 | Farley et al. | 89/1.815 |
| 4,736,910 | A | * | 4/1988 | O'Quinn et al. | 244/120 |
| 4,858,778 | A | * | 8/1989 | Patrick | 220/562 |
| 5,022,610 | A | * | 6/1991 | Ensign | 244/118.3 |
| 5,034,751 | A | * | 7/1991 | Miller, Jr. | 342/368 |
| 5,046,690 | A | * | 9/1991 | Nordstrom | 244/137.1 |
| 5,050,821 | A | * | 9/1991 | Kerstein et al. | 244/158 R |
| 5,083,727 | A | * | 1/1992 | Pompei et al. | 244/118.6 |
| 5,090,639 | A | * | 2/1992 | Miller et al. | 244/118.1 |
| 5,106,038 | A | * | 4/1992 | Dupont | 244/137.1 |
| 5,131,606 | A | * | 7/1992 | Nordstrom | 244/118.1 |
| 5,184,366 | A | * | 2/1993 | Rawdon et al. | 14/71.5 |
| 5,186,417 | A | * | 2/1993 | Pritchard | 244/137.1 |
| 5,259,575 | A | * | 11/1993 | Cabrera | 244/118.5 |
| 5,350,138 | A | * | 9/1994 | Culbertson et al. | 244/159 |
| 5,363,767 | A | * | 11/1994 | Robinson | 102/374 |
| 5,486,077 | A | * | 1/1996 | Nutting | 410/69 |
| 5,549,259 | A | * | 8/1996 | Herlik | 244/136 |
| 5,667,170 | A | * | 9/1997 | Moss et al. | 244/135 A |
| 5,763,811 | A | * | 6/1998 | Ruzicka | 89/1.51 |
| 5,782,427 | A | * | 7/1998 | Hermach | 244/2 |
| 5,827,022 | A | * | 10/1998 | Tovani | 410/78 |
| 5,927,650 | A | * | 7/1999 | Huber | 244/118.1 |
| 5,961,076 | A | * | 10/1999 | Eller et al. | 244/158 R |
| 5,975,464 | A | * | 11/1999 | Rutan | 244/120 |
| 5,979,833 | A | * | 11/1999 | Eller et al. | 244/158 R |
| 5,996,939 | A | * | 12/1999 | Higgs et al. | 244/135 A |
| 6,065,720 | A | * | 5/2000 | Ash et al. | 244/120 |
| 6,070,831 | A | * | 6/2000 | Vassiliev et al. | 244/120 |
| 6,176,452 | B1 | * | 1/2001 | Gallegos | 244/135 B |
| 6,239,767 | B1 | * | 5/2001 | Rossi et al. | 343/882 |
| 6,260,804 | B1 | * | 7/2001 | Anderson et al. | 244/158 R |
| 6,382,562 | B1 | * | 5/2002 | Whitlock et al. | 244/118.3 |
| 6,394,392 | B1 | * | 5/2002 | Lafferty | 244/118.1 |
| 6,474,927 | B1 | * | 11/2002 | McAdams et al. | 414/340 |
| 6,494,404 | B1 | * | 12/2002 | Meyer | 244/118.2 |
| 6,497,388 | B1 | * | 12/2002 | Friend et al. | 244/120 |
| 6,568,632 | B1 | * | 5/2003 | Page et al. | 244/36 |
| 6,578,798 | B1 | * | 6/2003 | Dizdarevic et al. | 244/199 |
| 6,595,466 | B1 | * | 7/2003 | Depeige et al. | 244/118.3 |
| 6,708,924 | B1 | * | 3/2004 | Page et al. | 244/36 |
| 6,764,048 | B1 | * | 7/2004 | Jakubowski et al. | 244/137.4 |
| 6,817,573 | B1 | * | 11/2004 | Harrison et al. | 244/75 R |
| 6,840,480 | B1 | * | 1/2005 | Carroll | 244/120 |
| 6,848,650 | B1 | * | 2/2005 | Hoisignton et al. | 244/13 |
| 6,889,940 | B1 | * | 5/2005 | Howe | 244/135 R |
| 2002/0074454 | A1 | * | 6/2002 | Henderson | 244/135 A |
| 2002/0148928 | A1 | * | 10/2002 | Oki | 244/118.1 |
| 2003/0006340 | A1 | * | 1/2003 | Harrison et al. | 244/12.3 |
| 2003/0066932 | A1 | * | 4/2003 | Carroll | 244/120 |
| 2004/0016846 | A1 | * | 1/2004 | Blackwell-Thompson et al. | 244/118.1 |
| 2004/0016852 | A1 | * | 1/2004 | Blackwell-Thompson et al. | 244/158 R |
| 2004/0135031 | A1 | * | 7/2004 | Stupakis | 244/120 |
| 2004/0195454 | A1 | * | 10/2004 | Page et al. | 244/120 |
| 2004/0211862 | A1 | * | 10/2004 | Elam | 244/58 |
| 2004/0245397 | A1 | * | 12/2004 | Garcia et al. | 244/137.1 |
| 2004/0245399 | A1 | * | 12/2004 | Blackwell-Thompson et al. | 244/150 |

* cited by examiner

TRANSFORMABLE AIRPLANE

FIELD OF THE INVENTION

This invention relates generally to aircraft and, more specifically, to multi-mission aircraft.

BACKGROUND OF THE INVENTION

Military air forces use large, typically widebody, aircraft to perform missions such as tanker, transport, bomber, and command and control missions. Numerous electronic, mechanical, and fluid systems and subsystems are integrated to configure a large aircraft for any one of these missions. Additionally, many structural modifications are made to a basic airframe to equip the aircraft to perform the mission. The system integration and structural modifications entailed represent significant large-scale-integration projects and are extremely expensive and time consuming.

As a result, these aircraft generally have been made to perform only one mission. One exception is the tanker/transport aircraft, such as the KC-135 tanker/transport aircraft made by The Boeing Company. While the KC-135 tanker/transport aircraft can perform both tanking and transport missions, the KC-135 is not reconfigurable to perform other missions, such as bombing or command and control. Likewise, currently known bombers or command and control aircraft are not reconfigurable to perform tanking and/or transport missions.

Because of the extreme costs involved in production of such aircraft, air forces have pursued service life extension programs for in-service fleets instead of buying new aircraft. Accordingly, in-service aircraft have become increasingly older. Due to increased aging of airframes, reliability has become lowered. This lower reliability has negatively impacted mission readiness. While mission readiness has decreased, operation and support (O&S) costs have increased.

Increased operational tempos, rapid deployments, and operational commitments would make it desirable for air forces to add aircraft to fleets of tanker, transport, bomber, and command and control aircraft. However, due in part to consumption of limited budgets by increased O&S costs, air forces are not able to pursue production programs for fleets of aircraft that are dedicated to each mission.

An aircraft that could be configured and reconfigured as desired for any one or more of these missions could reduce costs for production (as well as O&S costs) and yet increase operational readiness. However, there is an unmet need in the art for a transformable airplane.

SUMMARY OF THE INVENTION

Embodiments of the present invention provide a transformable airplane. Advantageously, embodiments of the present invention permit a single airframe to be reconfigured easily and rapidly to perform any one or a combination of tanking, transport, bombing, or command and control missions as desired for a tactical situation. As a result, production and O&S costs can be reduced while operational readiness can be increased.

Aircraft provided by embodiments of the present invention can be configured and reconfigured among any one or combinations of several mission-specific configurations merely by installing or replacing mission-specific modules as desired. The mission specific modules may be installed and removed quickly and easily—in less than 48 hours in some embodiments. As a result, operational flexibility that is not currently achievable can become available to mission planners.

According to an embodiment of the present invention, a reconfigurable aircraft includes a pair of wings and an aircraft body having at least one bay defined in an interior of the aircraft body. The at least one bay is configured to accept a plurality of removably replaceable modules that configure the aircraft to perform a plurality of missions. In addition, the exterior of the aircraft may include modular features that permit quick and easy reconfiguration, such as attachment points for refueling fixtures and ejection ports for ordnance.

According to an aspect of the present invention, the reconfigurable aircraft can be configured as a transport aircraft by installing in the interior of the aircraft a removably replaceable module that is adapted for a transport aircraft mission. For example, the removably replaceable module may include space and tie-downs for at least one cargo pallet and/or palletized seating. In addition, the aircraft may include a roll-on/roll-off ramp, as desired for a particular application.

According to another aspect of the present invention, the reconfigurable aircraft can be configured as a tanker aircraft by installing in the interior of the aircraft a removably replaceable module that is adapted for a tanker aircraft mission. For example, the removably replaceable module may include a tanking control station such as a remote aerial refueling operator station. Alternately, the remote aerial refueling operator station may be permanently installed if desired. The tanking control station may be provided as a dedicated tanking control station or may be a reconfigurable control station that is configured for use as a tanking control station. The exterior of aircraft may include at least attachment point that is configured to receive at least one mounting fixture that is, in turn, configured to mount an air refueling boom and/or an air refueling hose and drogue. Further, the aircraft may include at least one of an air refueling boom and an air refueling hose and drogue.

According to a further aspect of the present invention, the reconfigurable aircraft can be configured as a bomber aircraft by installing in the interior of the aircraft a removably replaceable module that is adapted for a bomber aircraft mission. For example, the removably replaceable module may include a bomb ejector. The bomb ejector may be a rotary bomb ejector that is disposed toward an aft end of the aircraft body and is operatively coupled to an ejection port for ejecting ordnance that is defined in an underside of the aircraft. Further, a bombing control station may be provided as a removably replaceable module or may be permanently installed as desired. The bombing control station may be provided as a dedicated bombing control station or may be a reconfigurable control station that is configured for use as a bombing control station.

According to another embodiment of the present invention, a reconfigurable command and control aircraft includes a pair of wings, an aircraft body having at least one bay defined in an interior of the aircraft body, and a plurality of phased array antennas. The at least one bay is configured to accept a plurality of removably replaceable modules that configure the aircraft to perform a plurality of missions. For example, the reconfigurable command and control aircraft can be configured as an ISR aircraft by installing in the interior of the aircraft a removably replaceable module coupled in signal communication with the plurality of phased array antennas. The removably replaceable module may include at least one command and control station. If further desired, the reconfigurable command and control aircraft may be configured as a self-contained arsenal aircraft by installing in the interior of the aircraft another removably replaceable module that is adapted for a bomber aircraft mission.

According to a further aspect of the present invention, a blended wing body may be used as a common airframe to provide various embodiments of the present invention. Use of a blended wing body can provide for increased payload, range, and flexibility over tube-and-wing aircraft while lowering production and life cycle costs. However, tube-and-wing airframes may also be used to provide various embodiments of the present invention.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a transformable airplane. Advantageously, embodiments of the present invention permit a single airframe to be reconfigured easily and rapidly to perform any one or a combination of tanking, transport, bombing, or command and control missions as desired for a tactical situation.

Embodiments of a reconfigurable aircraft will be explained that include a pair of wings and an aircraft body having at least one bay defined in an interior of the aircraft body. The at least one bay is configured to accept a plurality of removably replaceable modules that configure the aircraft to perform a plurality of missions. The airplane may be reconfigured quickly and easily among transport, tanker, and bomber missions, as well as any combination thereof. Other embodiments of a reconfigurable command and control aircraft will also be explained. Finally, another embodiment provided by an alternate airframe will be explained.

Figure 1:
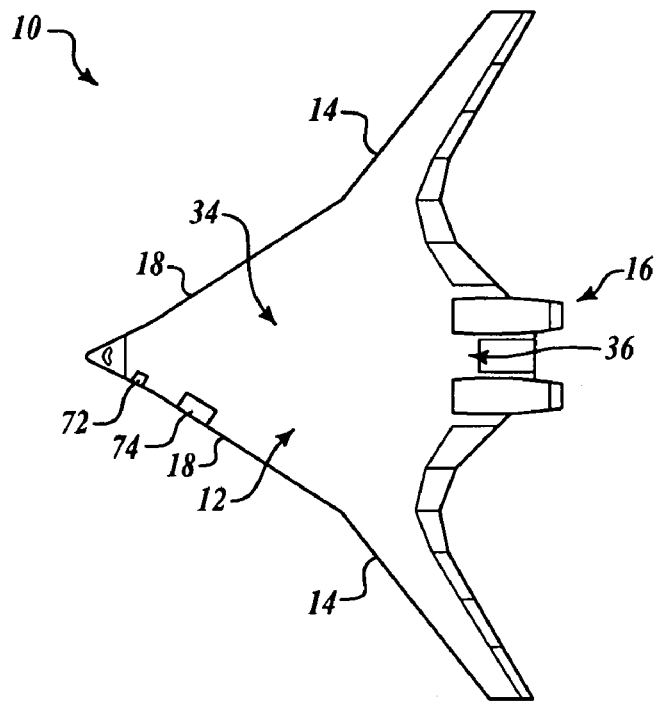
FIG. 1 is a plan view of an exemplary host airframe of a transformable airplane according to an embodiment of the present invention.
Figure 2:
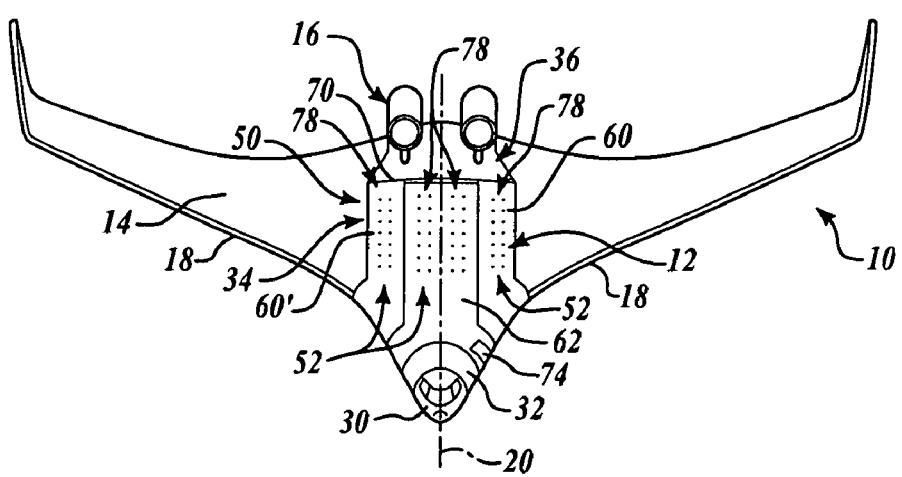
FIG. 2 is a perspective front view illustrating construction details of the airplane of FIG. 1.

Referring now to FIGS. 1 and 2, an exemplary transformable airplane 10 is embodied in a blended wing body (BWB) aircraft. Details of an exemplary host BWB aircraft are set forth in U.S. Pat. No. 6,568,632 ("the '632 patent") for "Variable Sized Blended Wing Body Aircraft" assigned to The Boeing Company, the contents of which are hereby incorporated in reference. A particular host BWB aircraft that is well-suited for embodiments of the reconfigurable airplane of the present invention is shown in FIG. 5A of the '632 patent, reproduced herein as FIG. 2.

The aircraft 10 includes an aircraft body 12, a pair of aircraft wings 14, a propulsion system 16 that includes a plurality of jet engines, a leading edge 18 that is cooperatively defined by the aircraft wings 14 and the aircraft body 12 and a centerline 20. The aircraft body 12 and aircraft wings 14 are each illustrated to have positive sweep angles.

In the exemplary, non-limiting embodiment illustrated, the aircraft body 12 is shown to include a cockpit 30, a transition section 32, a centerbody cabin 34, and an aft centerbody cabin 36. The transition section 32 ensures that the aircraft 10 is provided with a smooth aerodynamic and structural transition between the cockpit 30 and the centerbody cabin 34. The transition section 32 is also employed for housing front aircraft landing gear (not shown) and, as such, its construction may, also be tailored as desired in response to space and structural demands imposed by the front aircraft landing gear.

The centerbody cabin 34 is formed from longitudinally-extending body structures 50, with each of the body structures 50 on a first side of the centerline 20 being uniquely configured and oriented generally parallel to the centerline 20 and each of the body structures 50 on the other side of the centerline 20 being a mirror-image of its associated body structures 50 on the first side of the centerline 20. Each of the body structures 50 defines a compartment or bay 52 that may be configured to receive any of several mission-specific modules that may be installed, removed, and replaced quickly as described below.

More specifically, the plurality of body structures 50 includes a pair of end body structures 60 and 60' and an intermediate body structure 62. Those skilled in the art will understand that the body structures 50 having a private reference numeral (such as 60') are mirror images of an associated body structure that is located on an opposite side of the centerline 20 and that is designated by a similar but unprimed reference numeral (such as 60). As illustrated, the centerbody cabin 34 is configured such that each of the end body structures 60 and 60' is juxtaposed between the intermediate body structure 62 and one of the aircraft wings 14. Accordingly, the airplane 10 does not include a transition section having a negative sweep angle for interconnecting the aircraft body 12 and aircraft wings 14 and as such, there is no sharp discontinuity in the wing chord between the aircraft wings 14 and the centerbody cabin 34. Preferably, each of the body structures 50 terminates at its rearward point at a rear spar 70 of the airplane 10, thereby forming the aft pressure bulkhead for the aircraft 10 at the intersection between the centerbody cabin 34 and the aft centerbody cabin 36. A cargo door 72 is provided in the centerbody cabin 34. Given by way of non-limiting example, the cargo door 72 may be provided in the end body structure 60, such as on the port side of the airplane 10. However, it will be appreciated that the cargo door 72 may be located as desired for a particular application. A personnel access door 74 may be provided in the intermediate body structure 62, such as on the port side of the airplane 10.

Figure 3:
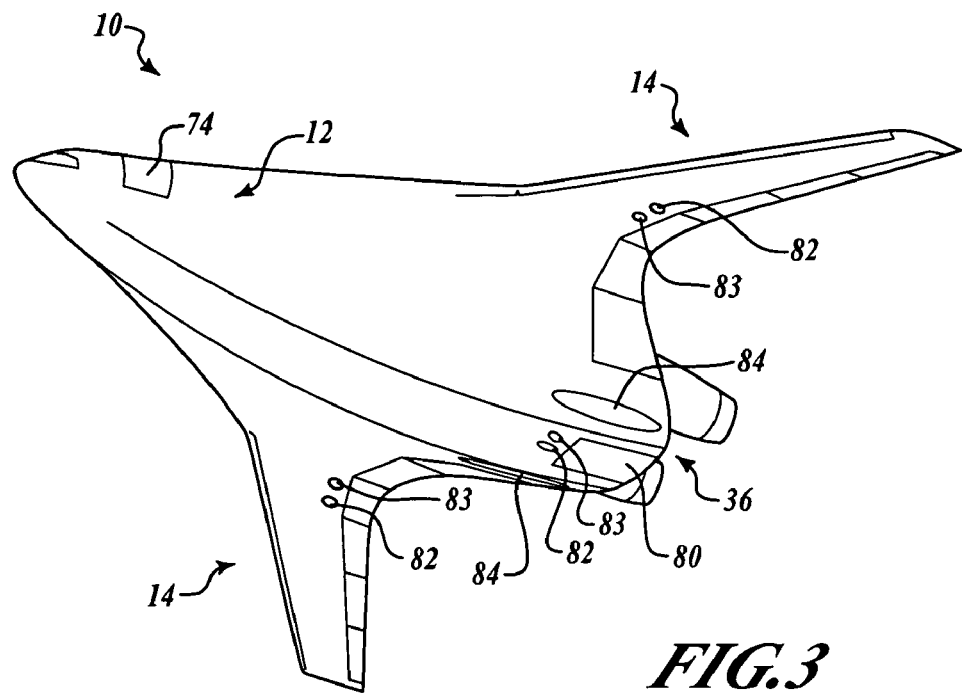
FIG. 3 is a perspective underside view illustrating details of the airplane of FIG. 1.

Referring now to FIG. 3, several features advantageously make the airplane 10 quickly and easily transformable to any one or a combination of missions as desired. For example, the airplane 10 is easily transformed into a transport aircraft. The cargo door 74 allows for easy loading of cargo. Referring briefly back to FIG. 2, each of the bay is 52 may be provided with rollers 78 that are installed in a deck of each of the body structures 50 that make up the bays 52. Advantageously, the rollers 78 permit cargo to be rolled into and out of the bays 52 easily as desired. Referring now to FIG. 3, a roll-on/roll-off (RO/RO) ramp 80 may be provided in an underside of the aft centerbody cabin 36. The RO/RO ramp 80 enables easy loading and unloading of vehicles, as will be explained below, when the airplane 10 is configured as a transport aircraft.

The airplane 10 is also easily transformed into a tanker aircraft. Mounting fixtures 82 and/or 83 are provided in an underside of the wings 14 and in an underside of the aft centerbody cabin 36. The mounting fixtures 82 and/or 83 provided in the underside of the aft centerbody cabin 36 may be located forward of the RO/RO ramp 80 when the RO/RO ramp 80 is provided. The mounting fixtures 82 are configured to receive and hold the forward end of an air refueling boom and the mounting fixtures 83 are configured to receive and hold the forward end of an air refueling hose and drogue, as desired for a particular mission. The mounting fixtures 82 and 83 are attached with disconnects to attachment points, such as hard points, on the exterior of the airplane 10. Further, it will be appreciated that the wings 14 each have large volumes for storing fuel. Advantageously, the fuel storage capacity of the wings is at least on the order of magnitude of the fuel storage capacity of the wings and fuel bladder of conventional tanker aircraft known in the art. As a result, the airplane 10 may be transformed into a tanker aircraft that can perform tanking missions without installation of a fuel bladder within the aircraft body 12. Internal plumbing (not shown) couples the fuel storage volumes of the wings 14 with the attachment points.

Further, the airplane 10 is also easily transformed into a bomber aircraft. Ejection ports 84 for ejecting ordnance are provided in an underside of the aft centerbody cabin 36 outboard the RO/RO ramp 80, when provided, and the mounting fixture 82 provided in the underside of the aft centerbody cabin 36.

Thus, it will be appreciated that the airplane 10 may be transformed quickly and easily into an airplane configured to perform any one or a combination of transport missions, tanking missions, and bombing missions. Details of various embodiments of the present invention that are configured to perform these missions will now be set forth below.

Figure 4:
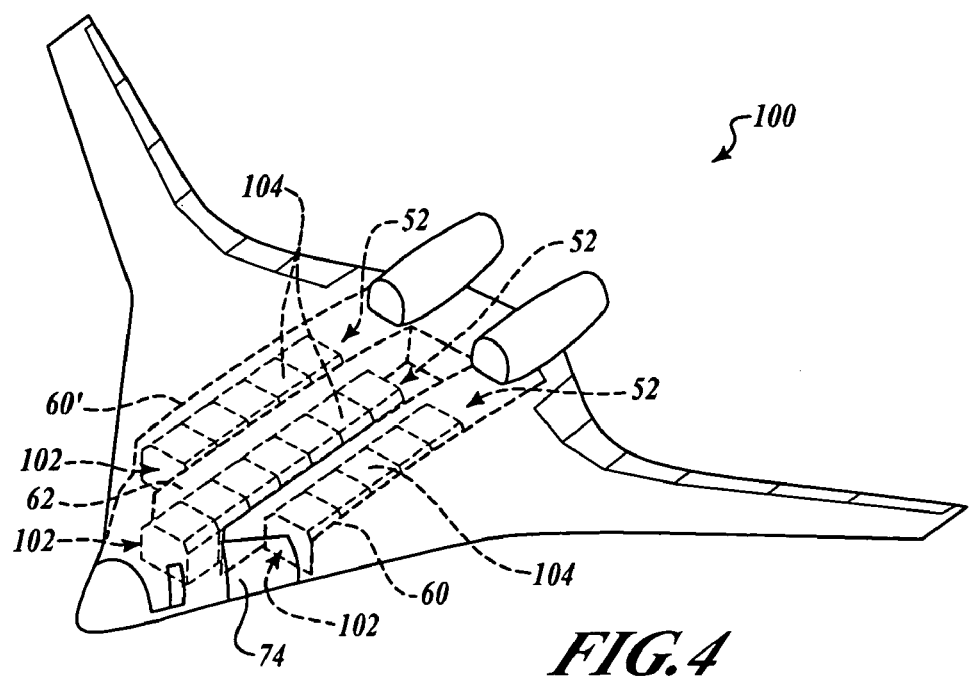
FIG. 4 is a perspective view of a an exemplary transport airplane according to an embodiment of the present invention.
Figure 5:
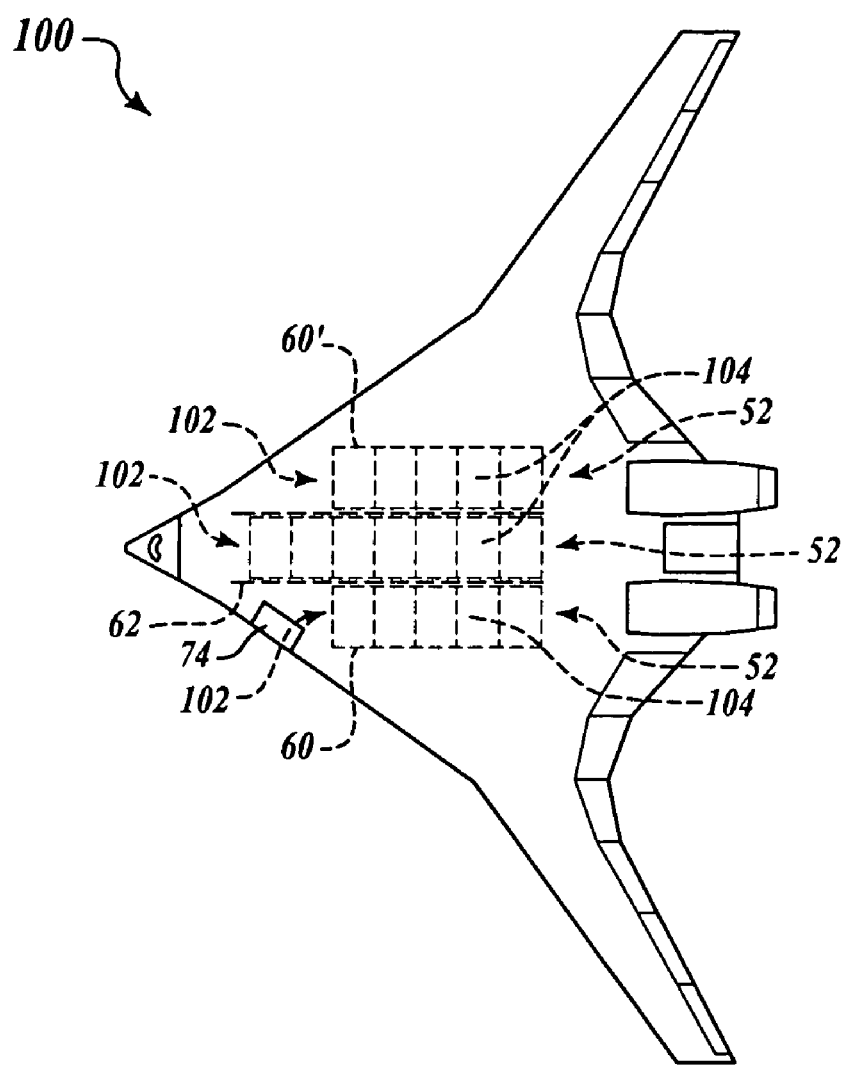
FIG. 5 is a plan view of the airplane of FIG. 4.

Referring now to FIGS. 4 and 5, the airplane 10 has been transformed into a transport aircraft 100. A transport mission module 102 is received in each of the bays 52. The mission modules 102 may each include space and tie-downs for several single deck, full-height pallets 104. Given by way of non-limiting example, the pallets 104 may be 463L military pallets, palletized seating such as seating for military troops, or the like.

Figure 6:
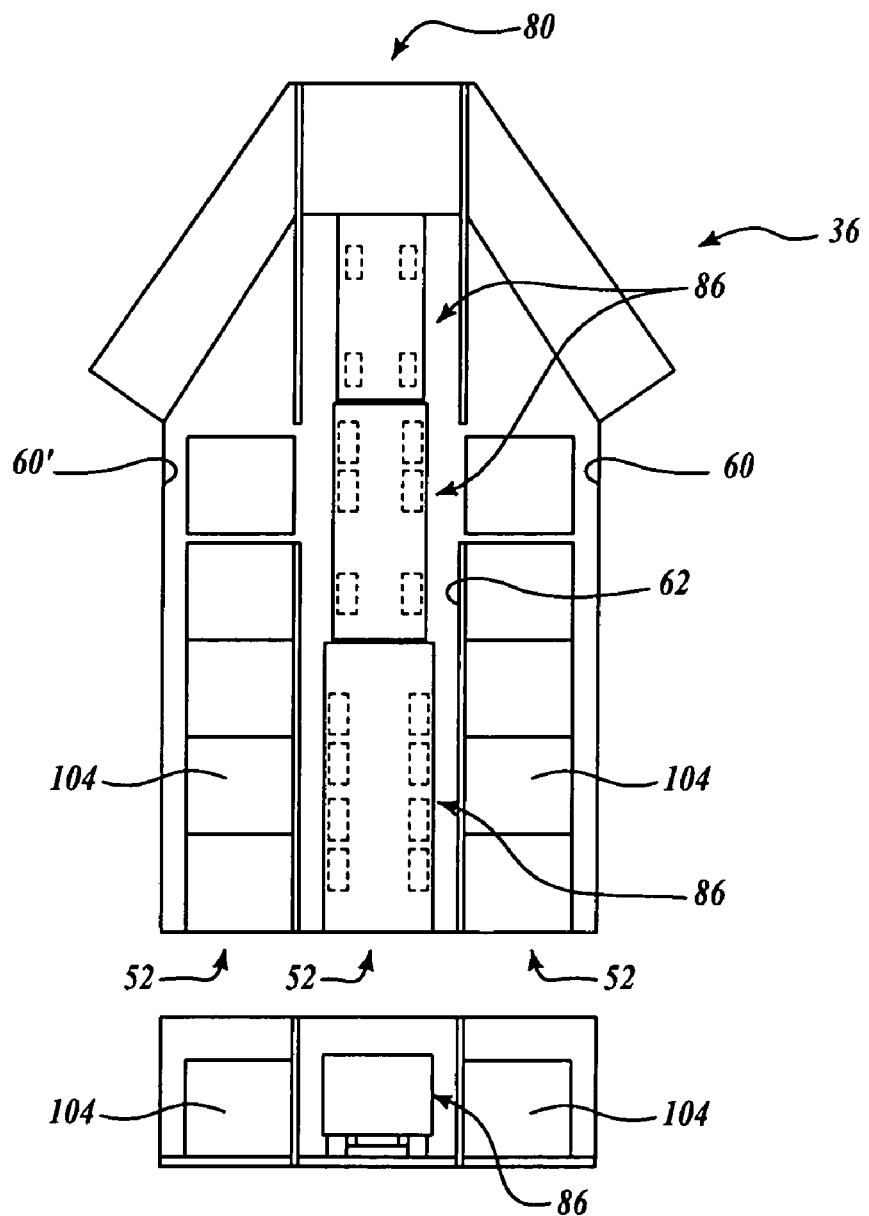
FIG. 6 is a plan view of a detail of the airplane of FIG. 4.
Figure 7:
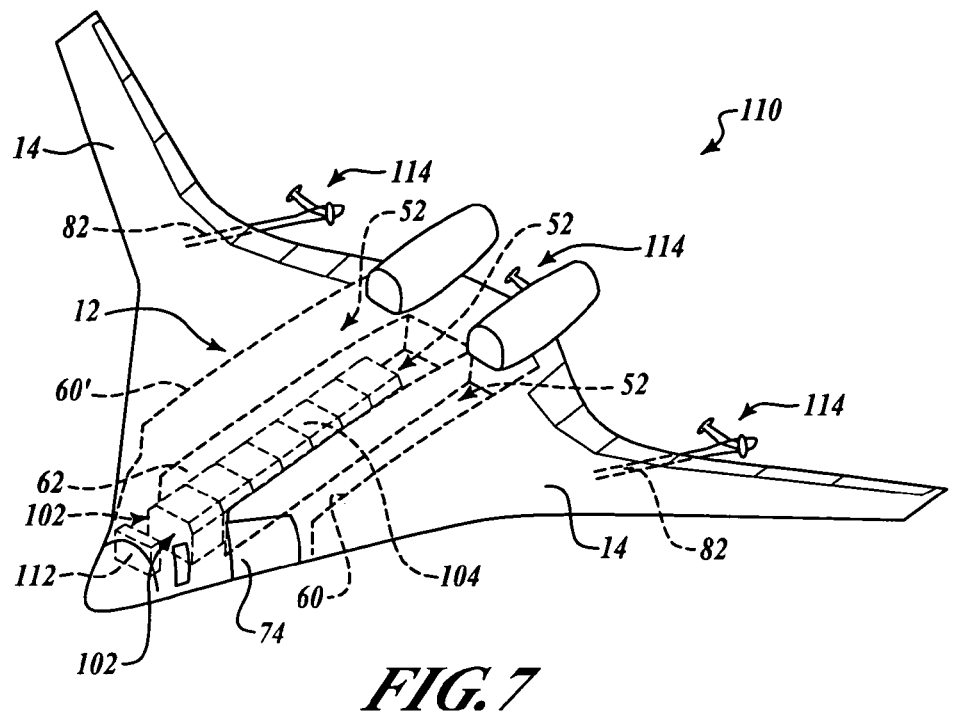
FIGS. 7 and 8 are perspective views of an exemplary tanker/transport airplane according to an embodiment of the present invention.
Figure 8:
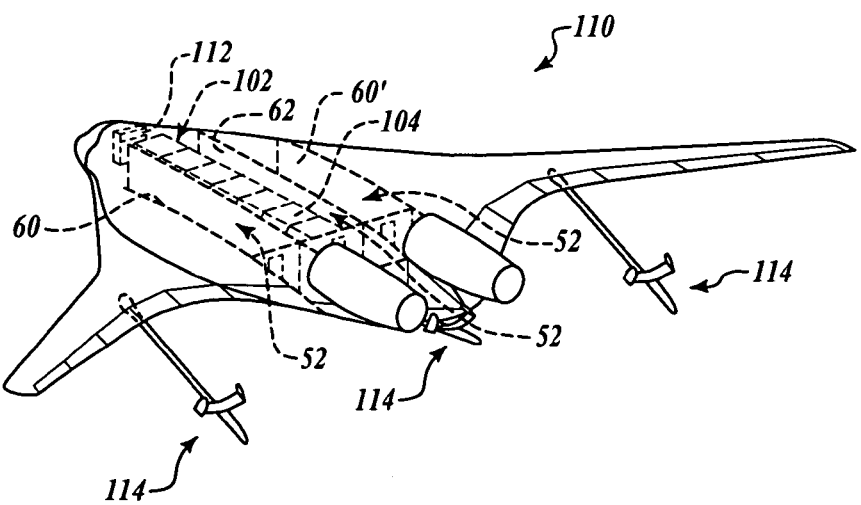
Figure 9:
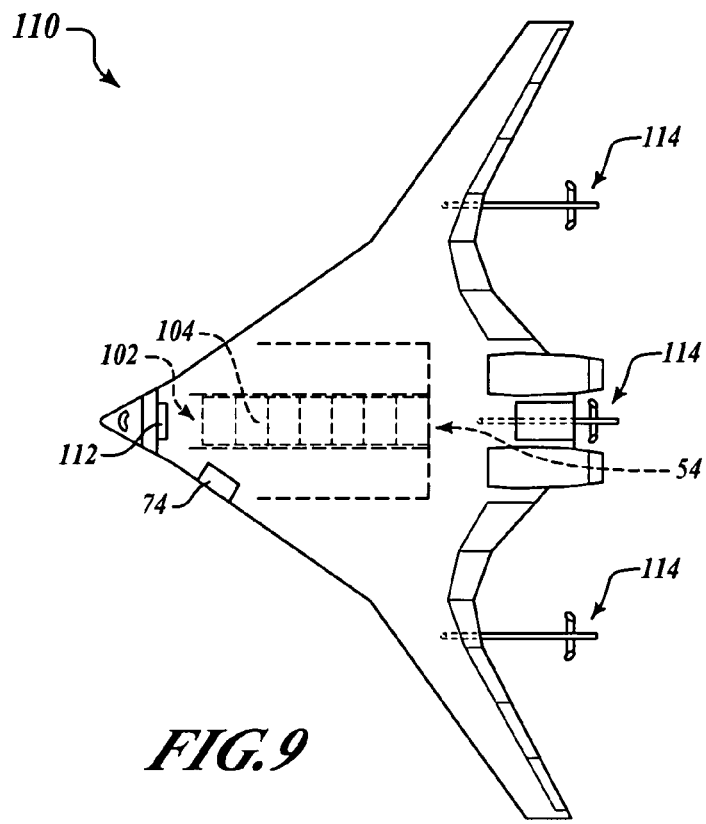
FIG. 9 is a plan view of the airplane of FIGS. 7 and 8.

Referring now to FIG. 6, the transport aircraft 100 suitably includes the RO/RO ramp 80 in the aft centerbody cabin 36. Advantageously, incorporating the RO/RO ramp 80 enables the transport aircraft 100 to carry in the bay 52 in the intermediate body structure 62 various vehicles 86, such as without limitation a Future Combat System (FCS) vehicle, a Stryker Infantry Carrier Vehicle, an FTTS vehicle, HMMWVs, helicopters such as Comanche helicopters, ISO containers, and the like. It will be appreciated that the pallets 104 may be carried in the bays 52 in the end body structures 60 and 60' when the vehicles 86 are in the bay 52 in the intermediate body structure 62.

Referring now to FIGS. 7–10, the airplane 10 has been transformed into a tanker aircraft 110. A tanking control station 112 such as a remote aerial refueling operator (RARO) station is installed in a forward section of the bay 52 in the intermediate body structure 62. The tanking control station 112 may be a dedicated control station that is configured specifically for controlling tanking operations. Alternately, the tanking control station may be a reconfigurable control station that may be configured to control any one or more of various operations, including tanking operations. The tanking control station 112 is easily loaded through the cargo door 74 and installed in place in the bay 52 in the intermediate body structure 62. The tanking control station 112 may be permanently installed or may be removably replaceable to permit increased flexibility in reconfiguring the aircraft, as desired for a particular mission.

Figure 10:
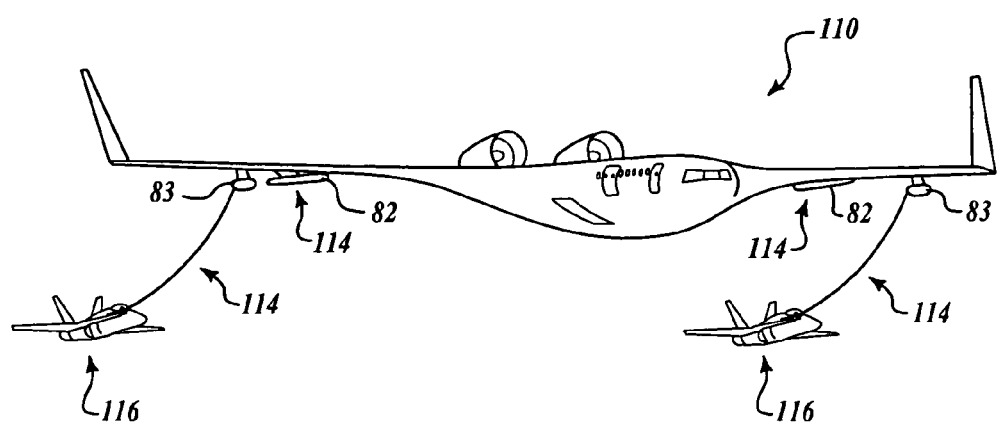
FIG. 10 is a perspective view of the airplane of FIGS. 7 and 8 tanking aircraft in-flight.

Forward ends of aerial refueling attachments 114 are received in the mounting fixtures 82 and/or 83 and are attached in a known manner. The aerial refueling attachments 114 are any aerial refueling booms or any aerial refueling hose and drogues that are well known in the art. Whether an aerial refueling boom or an aerial refueling hose and drogue is used depends on the type of aircraft that will be refueled in-flight by the tanker aircraft 110. For example, as is known, aircraft flown by the United States Air Force typically refuel by coupling into an aerial refueling boom. On the other hand, as is also known, aircraft flown by the United States Navy typically refuel by coupling into an aerial refueling hose and drogue. As shown in FIG. 10, tactical aircraft 116, such as the F/A-18C/D Hornet or F/A-18E/F Super Hornet made by The Boeing Company and flown by the United States Navy, are refueled by the tanker aircraft 110 by connecting to the aerial refueling hose and drogue 114 that has been attached to the mounting fixture 83.

Advantageously, as mentioned above, the fuel volume of the wings 14 is sufficiently large to permit the tanker aircraft 110 to perform refueling missions without addition of a fuel bladder in the aircraft body 12. Because interior space of the aircraft body is not taken up by a fuel bladder, the interior space of the aircraft body 12 advantageously can be utilized for carrying cargo. As a result, the tanker aircraft 110 can perform transport missions as well as tanking missions. That is, the tanker aircraft 110 suitably also can be designated as a tanker/transport aircraft (KC). To that end, the known transport mission module 102, such as the pallets 104, may be loaded into the bay 52 in the intermediate body structure 62. Additionally, transport mission modules, such as pallets or palletized seating, may be loaded in the bays 52 in the end body structures 60 and 60' as desired for a particular mission.

Figure 11:
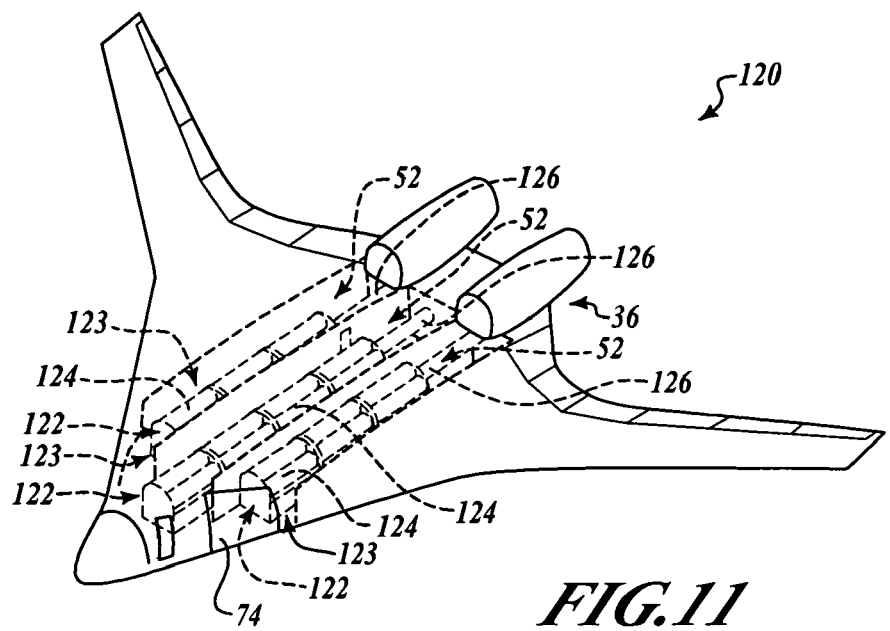
FIG. 11 is a perspective view of an exemplary bomber aircraft according to an embodiment of the present invention.
Figure 12:
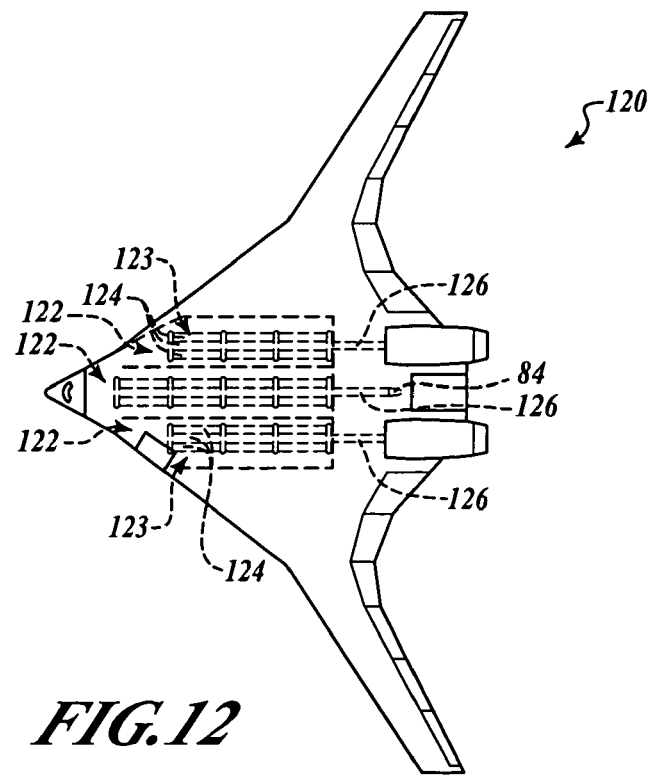
FIG. 12 is a plan view of the airplane of FIG. 11.

Referring now to FIGS. 11 and 12, the airplane 10 has been transformed into a bomber aircraft 120. Bombing mission modules 122 are loaded through the cargo door 74 and are installed in the bays 52 in the end body structures 60 and 60' and the intermediate body structure 62. The bombing mission modules 122 suitably are self-contained bomb racks 123 of ordnance 124, such as without limitation Joint Direct Attack Munition (JDAM), small diameter bombs, or the like. A bomb ejector 126, such as a rotary bomb ejector, connects the bombing mission modules 122 to the ejection ports 84 on the underside of the aft centerbody cabin 36. The bomb ejector 126 is any suitable bomb ejector known in the art.

A bombing control station 127 such as a launcher control console (LCC) or the like is installed in a forward section of the bay 52 in the intermediate body structure 62. The bombing control station 112 may be a dedicated control station that is configured specifically for controlling bombing operations. Alternately, the bombing control station may be a reconfigurable control station that may be configured to control any one or more of various operations, including bombing operations. The bombing control station 112 is easily loaded through the cargo door 74 and installed in place in the bay 52 in the intermediate body structure 62. The bombing control station 112 may be permanently installed or may be removably replaceable to permit increased flexibility in reconfiguring the aircraft, as desired for a particular mission.

Figure 13:
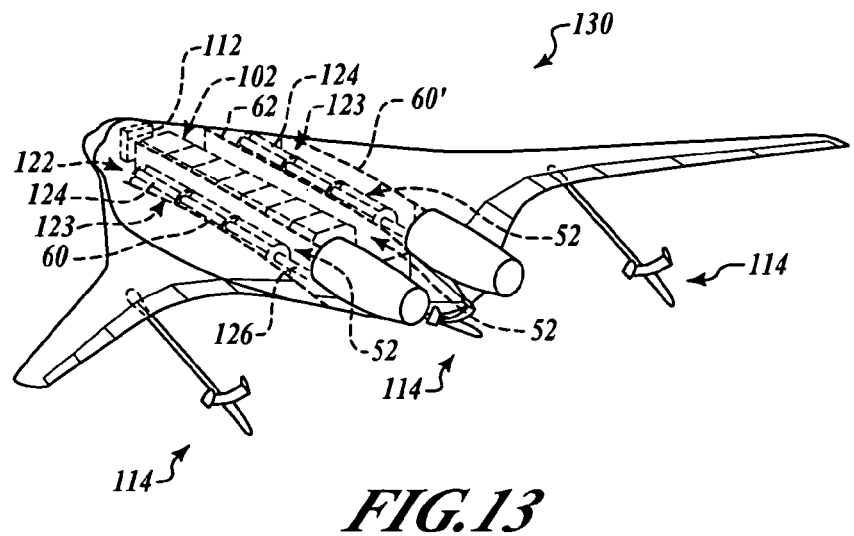
FIG. 13 is a perspective view of an exemplary tanker/transport/bomber aircraft according to an embodiment of the present invention.

Referring now to FIG. 13, the airplane 10 has been transformed into a tanker/transport/bomber aircraft 130. Modules and components described above have been installed in the airplane 10 to add mission functionality for tanking, for transport missions, and for bombing missions. For example, the aerial refueling attachments 114 have been added to incorporate tanking mission functionality. Further, the transport mission module 102 has been loaded in the bay 52 in the intermediate body structure 62. Finally, the bombing mission modules 122, such as the bomb racks 123 of ordnance 124 and the bomb ejectors 126 have been installed in the bays 52 in the end body structures 60 and 60' and have been coupled to the ejection ports 84. Advantageously, tanking operations and bombing operations are preferably controlled by one control station that is configurable to control the multiple missions of tanking and bombing. That is, control functions of the tanking control station 112 and the bombing control station 127 are incorporated into one control station.

Figure 14:
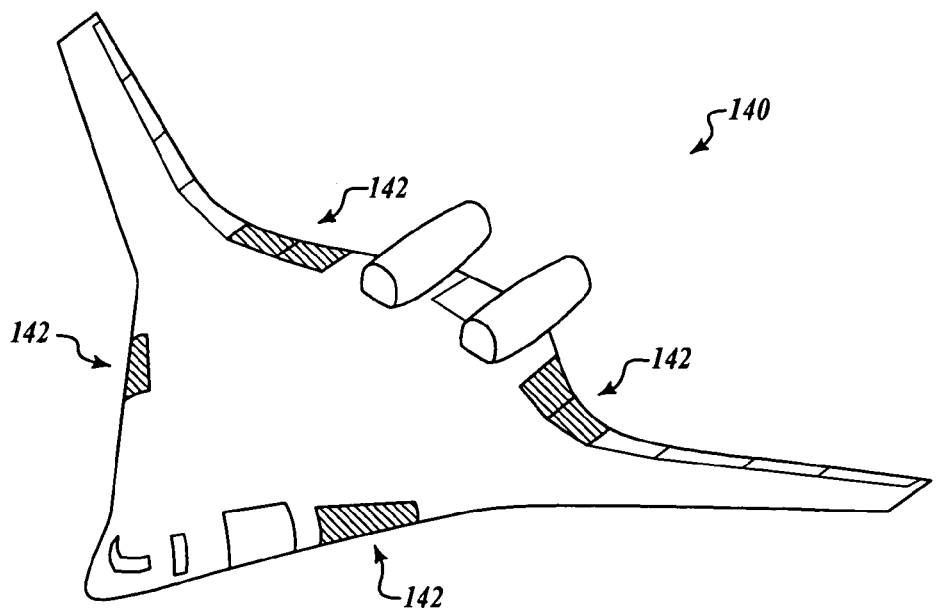
FIG. 14 is a perspective view of an exemplary ISR aircraft according to an embodiment of the present invention.

Referring now to FIG. 14, a command and control airplane 140 is provided in an alternate embodiment of the present invention. The command and control airplane 140 includes all of the components of the airplane 10 (FIGS. 1–3) and adds antenna systems 142, such as phased array antenna systems. Phased array antenna systems are well known in the art for transmitting and receiving radiofrequency (RF) signals in beams that are steered and controlled electronically. Given by way of non-limiting example, an exemplary phased array antenna system that may be incorporated in the airplane 140 is set forth in U.S. Pat. No. 5,276,455 to Fitzsimmons et al. and assigned to The Boeing Company, the contents of which are hereby incorporated by reference. It will be appreciated that suitable mechanical antennas may also be utilized, if desired, such as without limitation the mechanical antenna set forth in U.S. Pat. No. 6,633,266 to Blen et al. and assigned to The Boeing Company.

Figure 15:
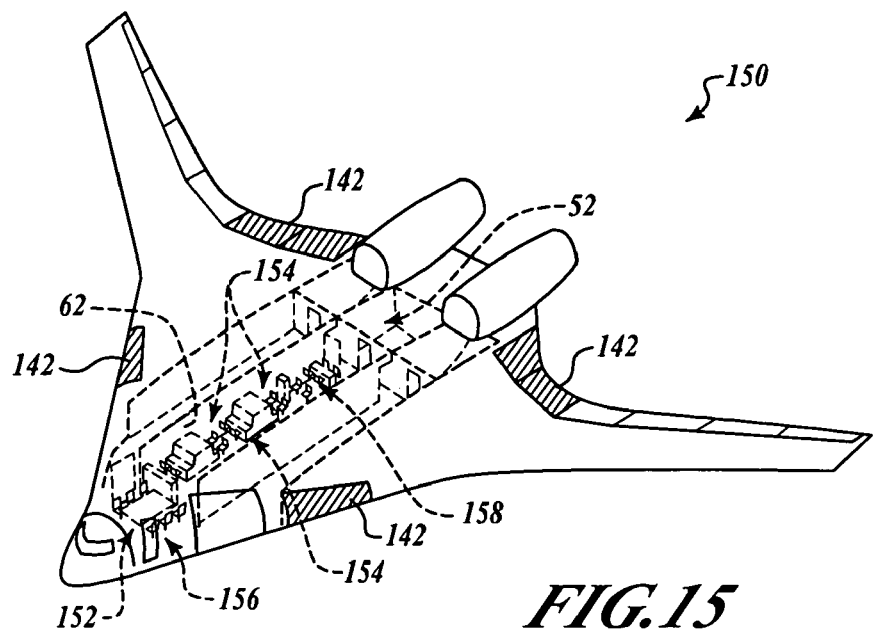
FIG. 15 is a perspective view illustrating details of the airplane of FIG. 14.
Figure 16:
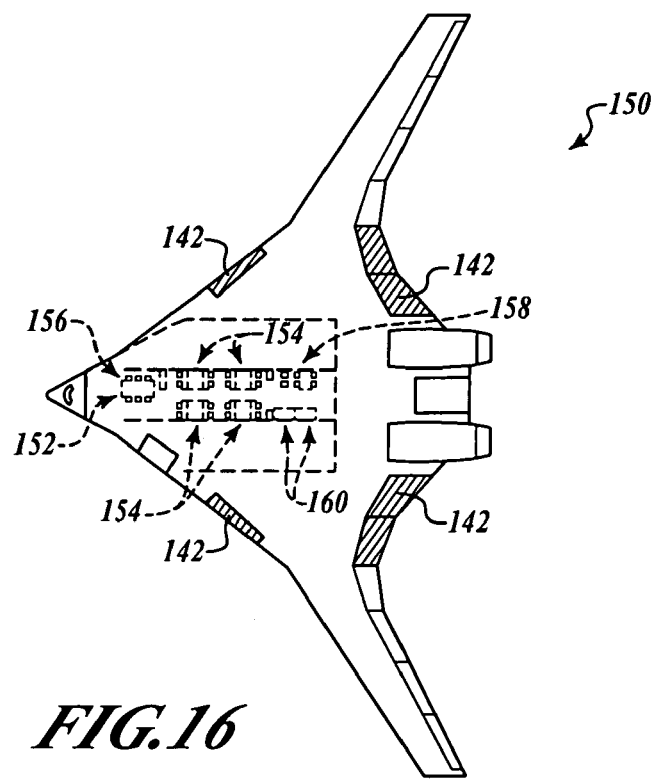
FIG. 16 is a plan view of the airplane of FIG. 14.

Referring now to FIGS. 15 and 16, the airplane 140 has been transformed into an intelligence/surveillance/reconnaissance (ISR) airplane 150. An ISR module 152 has been installed in the bay 52 in the intermediate body structure 62. The ISR module 152 may include submodules as desired for a particular intelligence mission. For example, the ISR module 152 may include command and control stations 154. The command and control stations 154 are operatively coupled to receive and process in any known manner signals from the phased array antenna systems 142. The ISR module 152 may also include a conference facility 156 and work areas 158, as desired for a particular mission. Because intelligence missions typically extend over long periods of time, bunks 160 may provided so crew members may rest.

Figure 17:
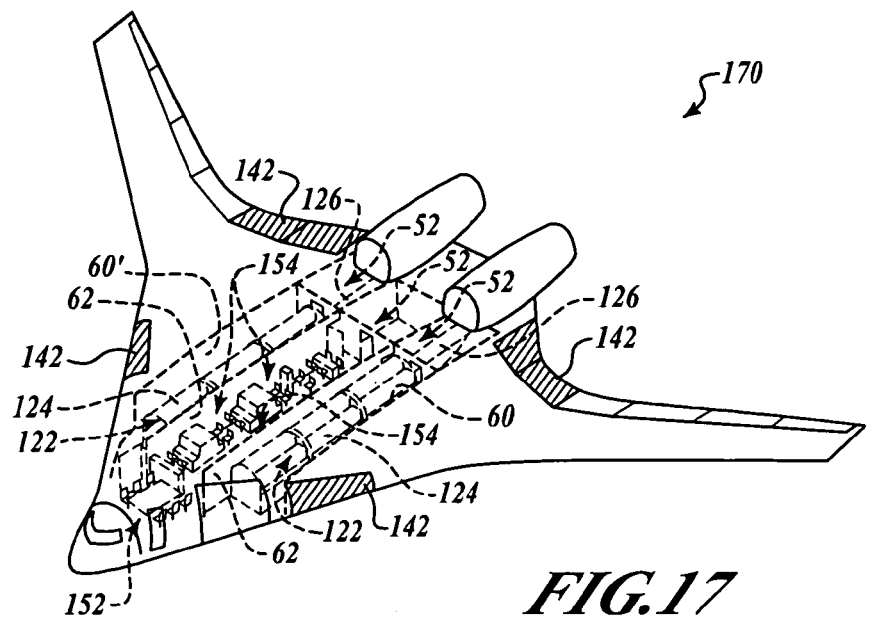
FIG. 17 is a perspective view of an exemplary hunter-killer aircraft according to another embodiment of the present invention.
Figure 18:
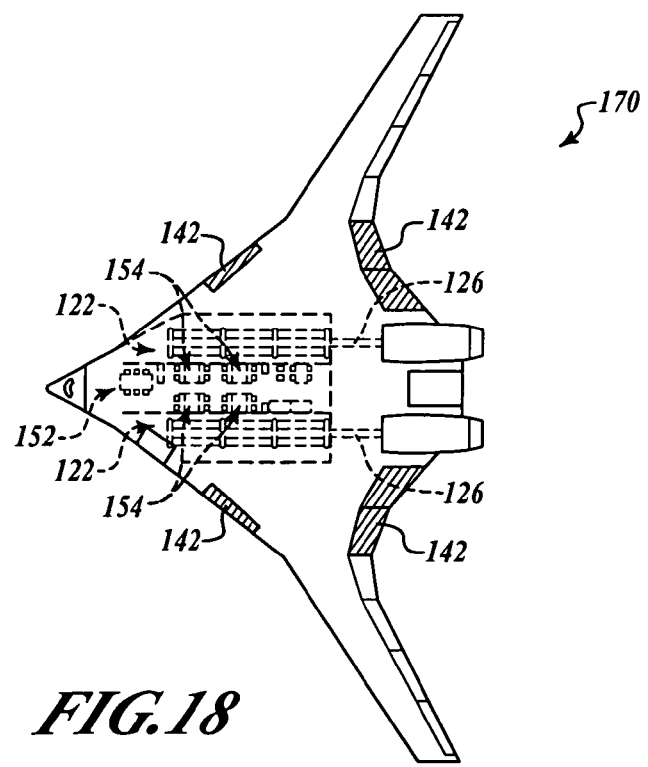
FIG. 18 is a plan view of the aircraft of FIG. 17.

Referring now to FIGS. 17 and 18, the airplane 140 has been transformed into a hunter-killer aircraft 170. The aircraft 170 incorporates the ISR module 152 in the bay 52 in the intermediate body structure 62 as well as the bombing mission modules 122 and the bomb ejectors 126 in the bays 52 in the end body structures 60 and 60'. The command and control stations 154 can be configured as desired to process signals received by the phased array antenna systems 142 as well as to function as fire control systems and launcher control consoles for the ordnance 124. As a result, the aircraft 170 can not only gather intelligence regarding contacts of interest, but can also prosecute the contacts of interest in real time.

Figure 21:
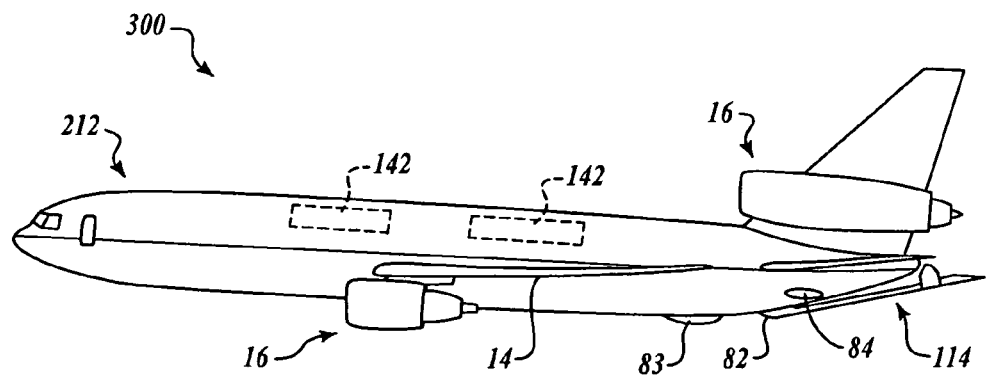

An alternate embodiment of the present invention is based upon a tube-and-wing airframe. Repeated reference numbers refer to components that have been previously explained. For the sake of brevity and clarity, repetition of their details are not necessary for an understanding of the embodiment and are not provided. Referring now to FIG. 21, a transformable airplane 200 includes an aircraft body 212, a pair of wings 14, and a propulsion system 16. In this alternate embodiment, the aircraft body 212 suitably is a conventional fuselage for a tube-and-wing type airframe. It will be appreciated that the blended wing body airframe used in the embodiments shown in FIGS. 1–18 is preferred because the blended wing body offers increased payload, fuel storage, range, and shorter reconfiguration times and labor efforts than does the conventional tube-and-wing airframe. However, it will also be appreciated that the transformable airplane 200 offers advantages in terms of mission flexibility over conventional aircraft that are not reconfigurable among several missions.

Figure 19:
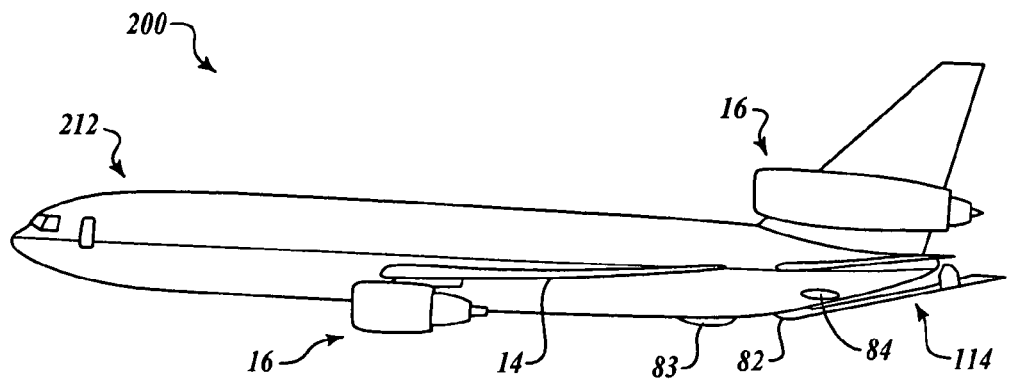
FIGS. 19–21 illustrate alternative tube and wing airframe embodiments of the present invention.

The transformable airplane 200 may be based on an airframe such as a KC-10 Extender tanker/transport, made by the McDonnell Douglas Corporation (now The Boeing Company), as shown in FIG. 19. However, it will be appreciated that the airplane 200 may be based on other tanker/transport aircraft, such as without limitation the KC-135 Stratotanker made by The Boeing Company, or the like. As in other embodiments, the airplane 200 includes the mounting fixtures 82 and 83 and the ejection ports 84. An aerial refueling boom 114 is attached to the mounting fixture 82.

Figure 20A:
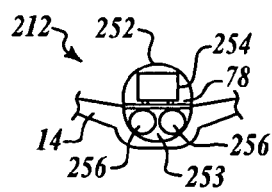

Referring now to FIG. 20A, an upper bay 252 and a lower bay 253 are defined within the aircraft body 212. The upper bay 252 includes rollers 78 installed in a deck of the aircraft body 212. A removably replaceable payload 254 is received in the upper bay 252. For transport missions, the payload 254 may include cargo, such as pallets or palletized seating as described above. A removably replaceable payload 256 is received in the lower bay 253. For bombing missions, the payload 256 may include a bomb rack as described above. Alternately, the payload 256 may include a fuel bladder for tanking missions.

Figure 20B:
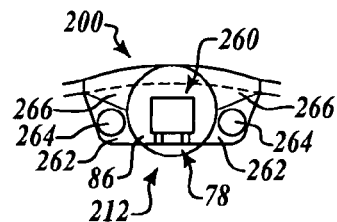
Figure 20C:
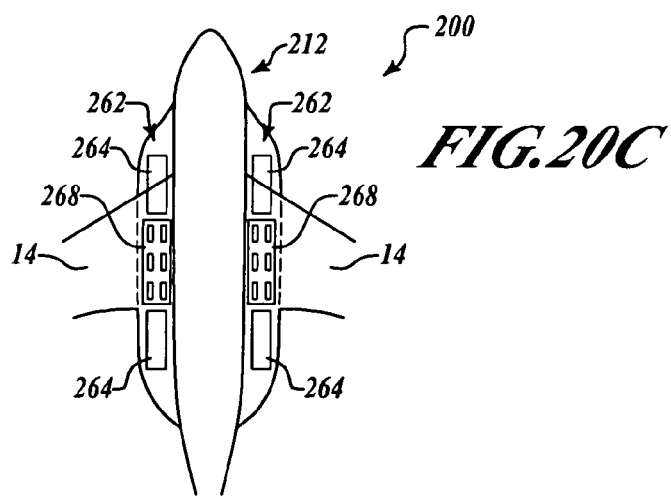

Referring now to FIGS. 20B and 20C, an alternate layout of the aircraft body 212 includes a bay 260 that includes rollers 78 and is configured to transport vehicles 86. An outer bomb bay 262 includes a payload 264. For tanking missions, the payload 264 may include a bladder. For bombing missions, the payload 264 may include a bomb rack as described above. Wing strakes 266 include fuel for tanking missions. The payloads 264 suitably are placed fore and/or aft of landing gear 268, as desired for a particular mission.

Figure 20D:
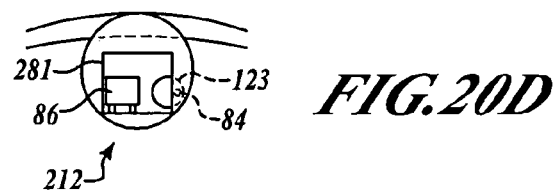
Figure 20E:
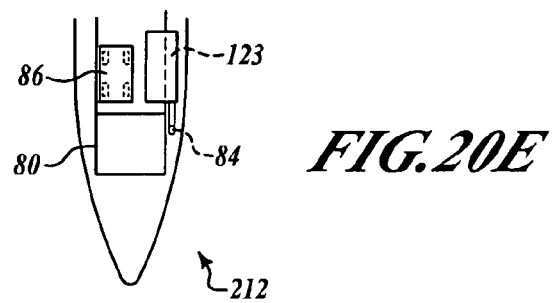

Referring now to FIGS. 20D and 20E, another alternate layout of the aircraft body 212 includes the RO/RO ramp 80. An opening 281 for the RO/RO ramp 80 accommodates onloading and offloading of vehicles 86. The bomb rack 123 is coupled to the ejection port as described above.

Referring now to FIGS. 21 and 20A, a command and control aircraft 300 includes the antenna systems 142 as described above. In this embodiment, the payload 254 is an ISR module, as described above, that is operatively coupled in signal communication with the antenna systems 142. In a hunter-killer embodiment, the payload 256 includes bomb racks.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A reconfigurable aircraft comprising:
a pair of wings; and
an aircraft body having at least one bay defined in an interior of the aircraft body, the at least one bay including a plurality of removably replaceable modules that configure the aircraft to perform a plurality of missions, the plurality of removably replaceable modules including a removably replaceable tanker module adapted for a tanker aircraft mission, the removably replaceable tanker module including a remote aerial refueling operator station.

2. The aircraft of claim 1, wherein the plurality of removably replaceable modules further includes a removably replaceable cargo module adapted for a transport aircraft mission.

3. The aircraft of claim 2, wherein the removably replaceable cargo module includes at least one cargo pallet.

4. The aircraft of claim 2, wherein the removably replaceable cargo module includes palletized seating.

5. The aircraft of claim 2, further comprising a roll-on/roll-off ramp.

6. The aircraft of claim 1, wherein the plurality of removably replaceable modules further includes a removably replaceable bomber module adapted for a bomber aircraft mission.

7. The aircraft of claim 6, wherein the removably replaceable bomber module includes a bomb ejector.

8. The aircraft of claim 7, wherein the bomb ejector includes a rotary bomb ejector disposed toward an aft end of the aircraft body.

9. The aircraft of claim 1, further comprising at least one mounting fixture configured to receive at least one of an air refueling boom and an air refueling hose and drogue.

10. The aircraft of claim 9, further comprising at least one of an air refueling boom and an air refueling hose and drogue.

11. The aircraft of claim 1, wherein the aircraft body includes a blended wing body.

12. The aircraft of claim 1, wherein the aircraft body includes a tube-and-wing aircraft body.

13. A reconfigurable aircraft comprising:
a pair of wings;
an aircraft body having at least one bay defined in an interior of the aircraft body, the at least one bay being configured to accept a plurality of removably replaceable modules that configure the aircraft to perform a plurality of missions;
a first removably replaceable module received in the interior of the aircraft, the first removably replaceable module being adapted for a transport aircraft mission; and
a second removably replaceable module received in the interior of the aircraft, the second removably replaceable module being adapted for a tanker aircraft mission, the second removably replaceable module including a remote aerial refueling operator station.

14. The aircraft of claim 13, wherein the first removably replaceable module includes at least one cargo pallet.

15. The aircraft of claim 13, wherein the first removably replaceable module includes palletized seating.

16. The aircraft of claim 13, further comprising a roll-on/roll-off ramp.

17. The aircraft of claim 13, further comprising at least one mounting fixture configured to receive at least one of an air refueling boom and an air refueling hose and drogue.

18. The aircraft of claim 17, further comprising at least one of an air refueling boom and an air refueling hose and drogue.

19. The aircraft of claim 13, wherein the aircraft body includes a blended wing body.

20. The aircraft of claim 13, wherein the aircraft body includes a tube-and-wing aircraft body.

21. A reconfigurable aircraft comprising:
a pair of wings;
an aircraft body having at least one bay defined in an interior of the aircraft body, the at least one bay being configured to accept a plurality of removably replaceable modules that configure the aircraft to perform a plurality of missions;
a removably replaceable transport module disposed within the bay that configures the aircraft for a transport aircraft mission;
a removably replaceable tanker module disposed within the bay that configures the aircraft for a tanker aircraft mission; and
a removably replaceable bomber module disposed within the bay that configures the aircraft for a bomber aircraft mission.

22. The aircraft of claim 21, wherein the removably replaceable transport module includes at least one cargo pallet.

23. The aircraft of claim 21, wherein the removably replaceable transport module includes palletized seating.

24. The aircraft of claim 21, further comprising a roll-on/roll-off ramp.

25. The aircraft of claim 21, wherein the removably replaceable tanker module includes a remote aerial refueling operator station.

26. The aircraft of claim 25, further comprising at least one mounting fixture configured to receive at least one of an air refueling boom and an air refueling hose and drogue.

27. The aircraft of claim 25, further comprising at least one of an air refueling boom and an air refueling hose and drogue.

28. The aircraft of claim 21, wherein the removably replaceable bomber module includes a bomb ejector.

29. The aircraft of claim 28, wherein the bomb ejector includes a rotary bomb ejector disposed toward an aft end of the aircraft body.

30. The aircraft of claim 21, wherein the aircraft body includes a blended wing body.

31. The aircraft of claim 21, wherein the aircraft body includes a tube-and-wing aircraft body.

32. A reconfigurable aircraft comprising:
a pair of wings;
an aircraft body having at least one bay defined in an interior of the aircraft body, the at least one bay including a plurality of removably replaceable modules that configure the aircraft to perform a plurality of missions, the plurality of removably replaceable modules including a removably replaceable tanker module adapted for a tanker aircraft mission, the removably replaceable tanker module including a remote aerial refueling operator station;
a cargo door disposed in a forward portion of the aircraft body;
a plurality of rollers provided in a deck of the aircraft body; and
at least one attachment point adapted to mount a mounting fixture that is configured to receive at least one of an air refueling boom and an air refueling hose and drogue.

33. The aircraft of claim 32, wherein the plurality of removably replaceable modules further includes a removably replaceable cargo module adapted for a transport aircraft mission.

34. The aircraft of claim 33, wherein the removably replaceable cargo module includes at least one cargo pallet.

35. The aircraft of claim 33, wherein the removably replaceable cargo module includes palletized seating.

36. The aircraft of claim 33, further comprising a roll-on/roll-off ramp.

37. The aircraft of claim 32, wherein the plurality of removably replaceable modules further includes a removably replaceable bomber module adapted for a bomber aircraft mission.

38. The aircraft of claim 37, wherein the removably replaceable bomber module includes a bomb ejector.

39. The aircraft of claim 38, wherein the bomb ejector includes a rotary bomb ejector disposed toward an aft end of the aircraft body.

40. The aircraft of claim 32, further comprising at least one of an air refueling boom and an air refueling hose and drogue.

41. The aircraft of claim 32, wherein the aircraft body includes a blended wing body.

42. The aircraft of claim 32, wherein the aircraft body includes a tube-and-wing aircraft body.

43. A reconfigurable aircraft comprising:
a pair of wings;
an aircraft body having at least one bay defined in an interior of the aircraft body, the at least one bay being configured to accept a plurality of removably replaceable modules that configure the aircraft to perform a plurality of missions;
a cargo door disposed in a forward portion of the aircraft body;
a plurality of rollers provided in a deck of the aircraft body;
at least one attachment point that is adapted to mount a mounting fixture that is configured to receive at least one of an air refueling boom and an air refueling hose and drogue,
a first removably replaceable module received in the interior of the aircraft, the first removably replaceable module being adapted for a transport aircraft mission; and
a second removably replaceable module received in the interior of the aircraft, the second removably replaceable module being adapted for a tanker aircraft mission, the second removably replaceable module including a remote aerial refueling operator station.

44. The aircraft of claim 43, wherein the first removably replaceable module includes at least one cargo pallet.

45. The aircraft of claim 43, wherein the first removably replaceable module includes palletized seating.

46. The aircraft of claim 43, further comprising a roll-on/roll-off ramp.

47. The aircraft of claim 43, further comprising at least one of an air refueling boom and an air refueling hose and drogue.

48. The aircraft of claim 43, wherein the aircraft body includes a blended wing body.

49. The aircraft of claim 43, wherein the aircraft body includes a tube-and-wing aircraft body.

50. A reconfigurable aircraft comprising:
a pair of wings;
an aircraft body having at least one bay defined in an interior of the aircraft body, the at least one bay being configured to accept a plurality of removably replaceable modules that configure the aircraft to perform a plurality of missions;
a cargo door disposed in a forward portion of the aircraft body;
a plurality of rollers provided in a deck of the aircraft body;
at least one mounting fixture configured to receive at least one of an air refueling boom and an air refueling hose and drogue;
a removably replaceable transport module disposed within the bay that configures the aircraft for a transport aircraft mission;
a removably replaceable tanker module disposed within the bay that configures the aircraft for a tanker aircraft mission; and
a removably replaceable bomber module disposed within the bay that configures the aircraft for a bomber aircraft mission.

51. The aircraft of claim 50, wherein the removably replaceable transport module includes at least one cargo pallet.

52. The aircraft of claim 50, wherein the removably replaceable transport module includes palletized seating.

53. The aircraft of claim 50, further comprising a roll-on/roll-off ramp.

54. The aircraft of claim 50, wherein the removably replaceable tanker module includes a remote aerial refueling operator station.

55. The aircraft of claim 54, further comprising at least one of an air refueling boom and an air refueling hose and drogue.

56. The aircraft of claim 50, wherein the removably replaceable bomber module includes a bomb ejector.

57. The aircraft of claim 56, wherein the bomb ejector includes a rotary bomb ejector disposed toward an aft end of the aircraft body.

58. The aircraft of claim 50, wherein the aircraft body includes a blended wing body.

59. The aircraft of claim 50, wherein the aircraft body includes a tube-and-wing aircraft body.

60. A reconfigurable aircraft comprising:
a pair of wings;
an aircraft body having at least one bay defined in an interior of the aircraft body, the at least one bay being configured to accept a plurality of removably replaceable modules that configure the aircraft to perform a plurality of missions;
a plurality of antennas;
a first removably replaceable module received in the interior of the aircraft, the first removably replaceable module coupled in signal communication with the plurality of antennas, the first removably replaceable module being adapted for an ISR aircraft mission and including at least one command and control station; and
a second removably replaceable module received in the interior of the aircraft, the second removably replaceable module being adapted for a bomber aircraft mission.

61. The aircraft of claim 60, wherein the second removably replaceable module includes a bomb ejector.

62. The aircraft of claim 61, wherein the bomb ejector includes a rotary bomb ejector disposed toward an aft end of the aircraft body.

63. The aircraft of claim 60, wherein the aircraft body includes a blended wing body.

64. The aircraft of claim 60, wherein the aircraft body includes a tube-and-wing aircraft body.

65. The aircraft of claim 60, wherein the antennas include phased array antennas.

66. A method of configuring an aircraft for a mission, the method comprising:
defining in an interior of an aircraft body at least one bay being configured to accept a plurality of removably replaceable modules that configure the aircraft to perform a plurality of missions;
disposing within the at least one bay a removably replaceable transport module that configures the aircraft for a transport aircraft mission
disposing within a second bay a removably replaceable tanker module that configures the aircraft for a tanker aircraft mission; and
disposing within a third bay a third removably replaceable module adapted for a bomber aircraft mission.

67. A reconfigurable aircraft comprising:
a pair of wings;
an aircraft body having a single fuselage with an interior that defines at least one bay the at least one bay being configured to accept within the single fuselage a plurality of removably replaceable modules that reconfigure the aircraft among a plurality of missions including at least one of a transport aircraft mission, a tanker aircraft mission, and a bomber aircraft mission;
a cargo door disposed in the single fuselage;
at least one air refueling attachment point coupled to at least one fuel storage volume and couplable to a mounting fixture that is configured to receive at least one of an air refueling boom and an air refueling hose and drogue; and
at least one ordnance ejection port defined in the single fuselage and configured to eject ordnance from the single fuselage, the at least one ordnance ejection port being couplable to one of the plurality of removably replaceable modules within the single fuselage that configures the aircraft for a bomber aircraft mission.

68. The aircraft of claim 67, further comprising at least one of a plurality of rollers provided in a deck of the aircraft body and a roll-on/roll-off ramp.

69. The aircraft of claim 67, wherein the plurality of removably replaceable modules includes at least one of palletized seating and at least one cargo pallet.

70. The aircraft of claim 67, wherein the plurality of removably replaceable modules includes a remote aerial refueling operator station.

71. The aircraft of claim 67, further comprising at least one mounting fixture configured to receive at least one of an air refueling boom and an air refueling hose and drogue.

72. The aircraft of claim 71, further comprising at least one of an air refueling boom and an air refueling hose and drogue.

73. The aircraft of claim 67, wherein the wherein the plurality of removably replaceable modules includes a bomb ejector.

74. The aircraft of claim 67, wherein the aircraft body includes a blended wing body.

75. The aircraft of claim 67, wherein the aircraft body includes a tube-and-wing aircraft body.

* * * * *